United States Patent [19]
Goodwin

[11] Patent Number: 5,688,299
[45] Date of Patent: Nov. 18, 1997

[54] AIR FILTERS

[76] Inventor: Thomas Ivor Goodwin, 71 Loughborough Road, Haven, Loughborough, Leicestershire. LE12 5HY, United Kingdom

[21] Appl. No.: 514,992

[22] Filed: Aug. 14, 1995

[30] Foreign Application Priority Data

Aug. 16, 1994 [GB] United Kingdom .................... 9416487

[51] Int. Cl.$^6$ .................................................... B01D 27/08
[52] U.S. Cl. .................... 55/385.3; 55/487; 55/490; 55/492; 55/498; 55/DIG. 28; 123/198 E
[58] Field of Search .................... 55/385.3, 486, 55/487, 490, 492, 494, 495, 498, DIG. 28; 123/198 E

[56] References Cited

U.S. PATENT DOCUMENTS

| | | | |
|---|---|---|---|
| 1,892,210 | 12/1932 | Gordon | 55/492 |
| 2,996,145 | 8/1961 | Thornburgh | 55/498 |
| 3,298,149 | 1/1967 | Sobeck | 55/498 |
| 3,399,516 | 9/1968 | Hough, Jr. et al. | 55/487 |
| 3,508,383 | 4/1970 | Humbert, Jr. et al. | 55/498 |
| 4,224,044 | 9/1980 | King | 55/498 |
| 4,402,379 | 9/1983 | Hoshi | 55/385.3 |
| 4,648,474 | 3/1987 | Shinozaki et al. | 55/385.3 |
| 5,100,443 | 3/1992 | Berto | 55/498 |
| 5,350,444 | 9/1994 | Gould et al. | 55/385.3 |
| 5,368,621 | 11/1994 | Pool | 55/498 |

FOREIGN PATENT DOCUMENTS 2359221  6/1974  Germany ............................... 55/492

*Primary Examiner*—C. Scott Bushey
*Attorney, Agent, or Firm*—Adams Law Firm, P.A.

[57] ABSTRACT

An air filter includes a base member, a filter element, a connector for connecting the base member to a support, and releasable securing members for releasably securing the filter element to the base member. When the securing members are released, the filter element is removable from the base member while the base member remains connected to the support.

18 Claims, 4 Drawing Sheets

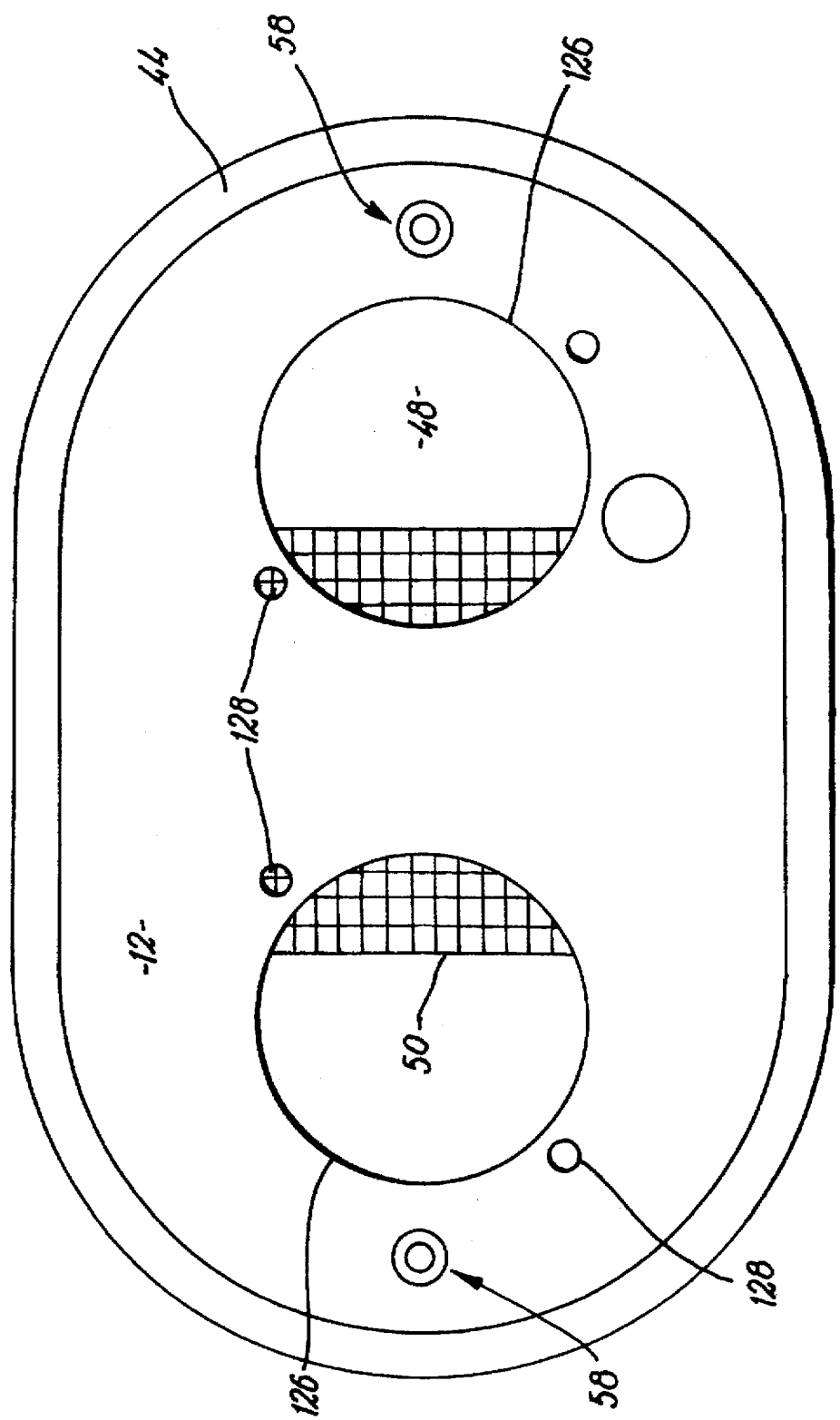

AIR FILTERS

BACKGROUND OF THE INVENTION

This invention relates to air filters. More particularly, but not exclusively, this invention relates to air filters for use in internal combustion engines, for example internal combustion engines in motor vehicles.

Air filters in internal combustion engines can be in the form of a cylindrical pan having a base member and a top member in between which the filter material is arranged. A bolt extends from the top member through the bottom member and is secured to the carburettor. In order to change the air filter, it is necessary to remove the bolt, and then remove the top member to change the filter element. This process can be time consuming to perform which can be detrimental in motor sport.

It is an object of this Invention to obviate and/or mitigate this disadvantage.

SUMMARY OF THE INVENTION

According to one aspect of this invention there is provided an air filter comprising a base member, a filter element, connecting means for connecting the base member to a support, and releasable securing means for releasably securing the filter element to the base member, whereby when said securing means is released, the filter element can be removed from the base member while the base member remains connected to the support.

Preferably, the filter element is in the form of a one piece moulding. The filter element may comprise a filter material attached to a support frame, whereby the filter element is attached to the base member at said support frame. The filter material may be formed of a foamed plastics material, preferably polyurethane.

The filter material may comprise an inner section having fine filter properties and an outer section having coarse filter properties.

The air filter may be substantially cylindrical in configuration having a bottom wall, side wall and a top wall. The base member may substantially constitute said bottom wall. The filter material may constitute said side well and may also constitute said top wall.

The filter element may also include strengthening means to impart rigidity to said filter material. Preferably, the strengthening means comprises a wire mesh arranged on the inside of said side wall. The strengthening means may also comprise a wire mesh arranged on the inside of said top wall.

Preferably, the filter element is formed by arranging in a mould the strengthening means and thereafter introducing liquid plastics material into the mould, whereby the liquid plastics material cures to form the support frame. Preferably, the plastics material Is polyurethane. The filter material may then be affixed to sold strengthening means and sold support frame by an appropriate adhesive.

Alternatively, the filter elements can be formed by introducing the liquid plastics material into the mould containing the strengthening means and the filter material. This has the advantage that it does not require a two step process.

Sealing means may be provided between sold support frame end said base member. Preferably, the sealing means is provided on the support frame and may comprise a gasket. The gasket may be so provided during the moulding process.

The base member may be provided with an opening through which filtered air can exit the filter.

The connecting means preferably extends through said base member to connect the base member to a support. In one embodiment, the connecting means comprises an elongate threaded fastener, which is preferably in the form or a bolt, and which is adapted to be threadably received in an appropriate recess in the support.

In the case where the air filter is used to filter air for an internal combustion engine the support may be in the form of a carburettor.

The connection means may further include an elongate strip extending across said opening through which the threaded fastener may extend. The elongate strip is preferably attached at its opposite end portions to said base member, conveniently by welding, although it will be appreciated that other suitable means of attachment can be used, for example an adhesive material.

Conveniently, the elongate strip comprises a central portion through which the threaded fastener extends and first and second mid portions arranged opposite each other between said central portion and said end portions. Preferably, the mid portions are substantially planar end are arranged substantially perpendicular to said base member.

The releasable securing means may comprise suitable quick release means known in the art. Alternatively the releasable securing means may comprise elongate threaded members extending from the support frame and being adapted to be received through corresponding apertures in the base member. The releasable securing means may further include suitable threaded members such as nuts, preferably, wing nuts, adapted to be screwed onto the elongate threaded members. Preferably, the air filter comprises three such securing means equispaced about the perimeter region or the support frame.

In another embodiment of the invention, the air filter is of an oval configuration in plan view, having first and second opposite end regions with a curved perimeter and side portions with a substantially straight perimeter. In this embodiment, the securing means may be arranged at said opposite end regions.

The connecting means may comprise a plurality of elongate threaded fasteners adapted to extend through a corresponding plurality of corresponding apertures in the base member. Conveniently, the threaded members are in the form of bolts adapted to be screwed into corresponding threaded recesses in the support. The base member may be in the form of a substantially flat plate provided with air outlet openings to allow filtered air to exit from the filter. Preferably, the support is in the form or a carburettor, and the air outlet openings on the base member correspond to the number at air inlets on the carburettor.

BRIEF DESCRIPTION OF THE DRAWINGS

Embodiments of the invention will now be described by way of example only with reference to the accompanying drawings, in which:

FIG. 4 is a bottom plan view of the embodiment shown in FIG. 3.

DETAILED DESCRIPTION

Figure 1:
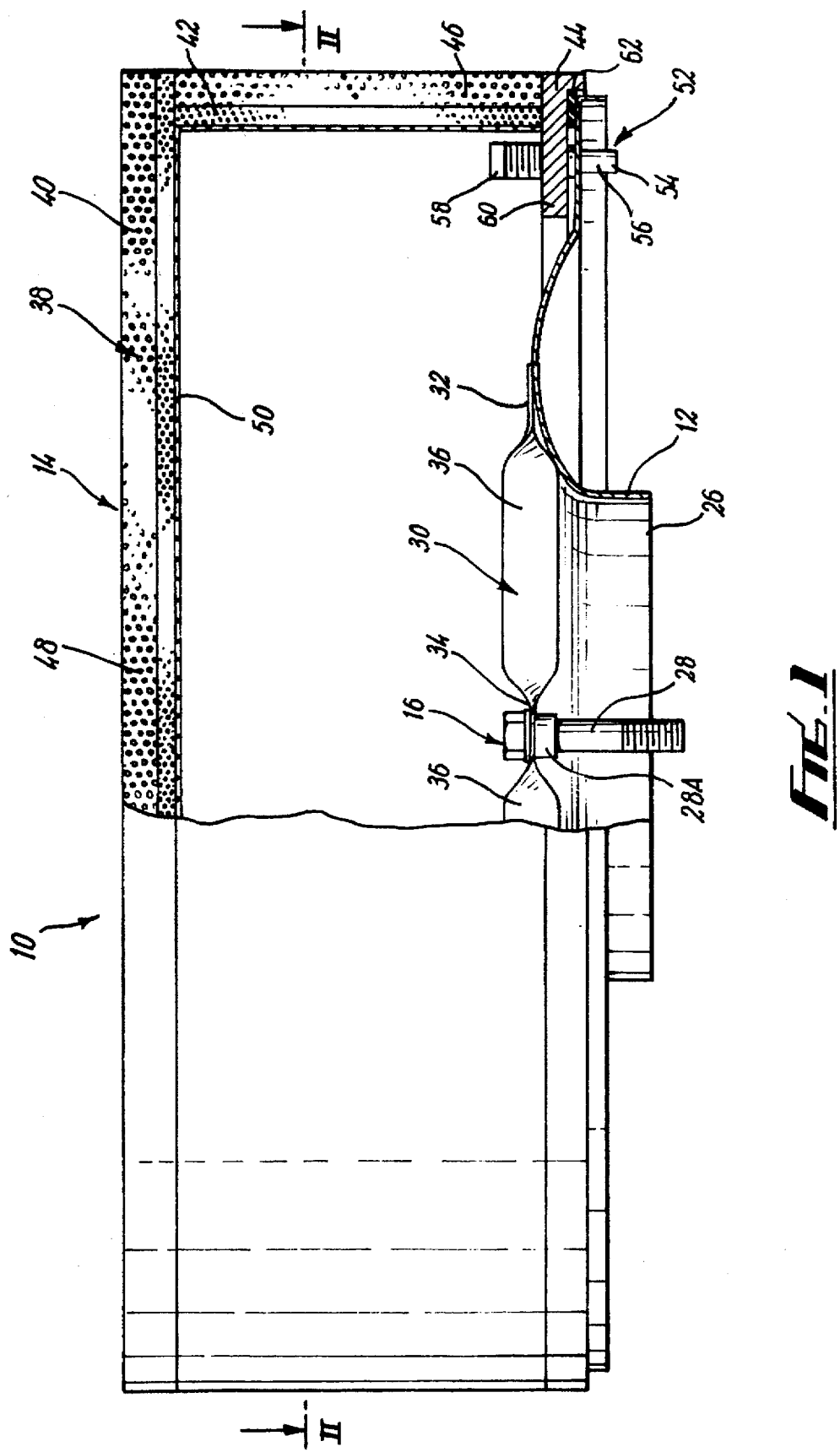
FIG. 1 is a part sectional side view of a first embodiment.
Figure 2:
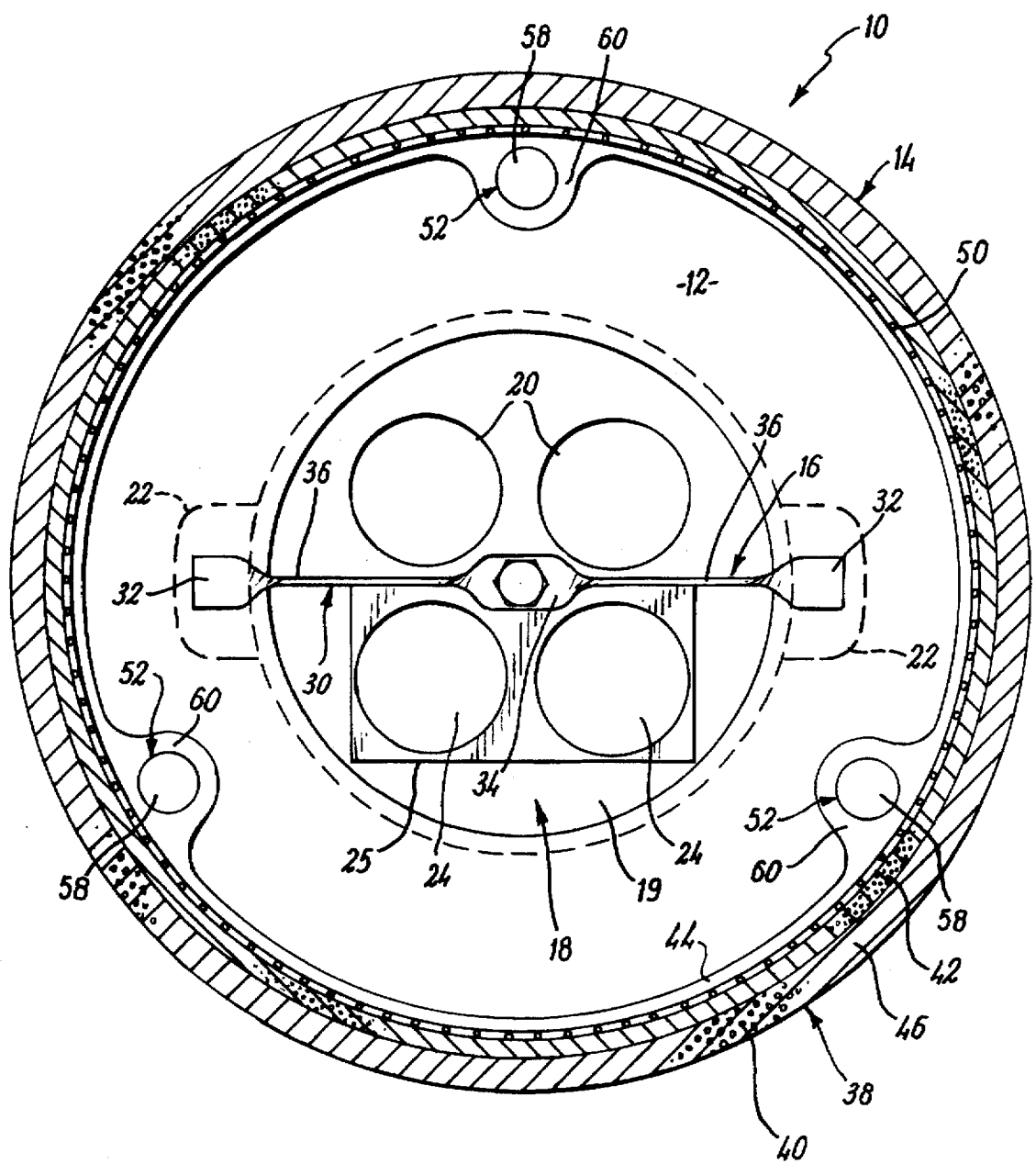
FIG. 2 is a view along the lines II—II in FIG. 1.

Referring to FIGS. 1 and 2, there is shown an air filter 10 which is particularly suitable for use with an internal combustion engine of a motor vehicle. The air filter 10 comprises a base member 12, in the form of a plate, and a filter element 14 mounted on the base member 12. Connecting means 16 is provided to connect the air filter 10 to an appropriate support, for example a carburettor 18 as shown in FIG. 2. The carburettor 18 is a known carburettor and comprises a main body 19 defining inlet ports 20,24, the inlet ports 24 being associated with a cold start device in the form of a rectangular flap 25.

The base member 12 defines an aperture 26 to allow filtered air to pass to the carburettor 18.

The connection means 16 comprises a bolt 28 and a twisted substantially flat strip 30 extending diametrically across the aperture 26. As can be seen from FIGS. 1 and 2, the strip 30 is twisted to define end portions 32 which are attached to the main body 12 by, for example, welding. Although it will be appreciated that the end portions 32 could be attached to the base member 12 by other suitable means, for example adhesive. The strip 30 also comprises a central portion 34 through which the bolt 28 extends to be received in an appropriate correspondingly threaded recess in the carburettor 18. The bolt 28 can also be provided with appropriate washers end spacers 28A.

The strip 30 also comprises mid-portions 36. As can be seen from FIGS. 1 end 2, the strip 30 has been so twisted that the mid-portions 36 are substantially perpendicular to the central portion 34. The mid portions 36 are aligned with an edge of the flap, which as shown in FIG. 2 is directly below the mid portions 76. Thus, the strip 30 is so arranged that air flow to the inlet ports 20,24 is not disturbed.

The filter element 14 is in the form of a one piece moulding, which comprises a filter material 38 which is divided into two sections, a first section 40 which has coarse filter properties, and a second section 42 which has fine filter properties. The filter material 38 is formed from a foamed plastics material such as polyurethane. This has the advantage that air being filtered by the filter 10 passes through the first section 40 in which course particles are filtered out, end then passes through the second section 42 in which finer particles are then filtered out. The filter material 38 is mounted upon a support frame 44 which extends all the way round the filter element 14.

As can be seen from FIG. 1, the filter element 14 is substantially cylindrical in configuration having a side wall 46, and a top wall 48. Strengthening means in the form of a mesh 50 extend around the side wall 40 and across the top wall 48.

In order to secure the filter element 14 to the base member 12, securing means 52 are provided. As can be seen From FIG. 2, three securing means 52 are equispaced around perimeter region of the filter 10.

The securing means 52 comprise quick release fasteners in the form of a stud 54 mounted on the base member 12. The stud 54 comprises a button 56. Extending from the button 56 upwardly therefrom as shown in FIG. 1, there is an elongate projection having at an end region thereof a cross piece attached thereto extending substantially perpendicularly to the projection to define a T-shaped configuration. The projection is adapted to be received in a receptacle 58 mounted on the support frame 44 on inwardly extending members 60. The receptacle 58 is provided with movable appropriately formed surfaces whereby by pressing the button 56, the stud 54 can be locked in the receptacle 58, or released therefrom. The above described quick release fasteners are known in the art and their operation would be appreciated by a skilled person.

It will be appreciated that the securing means 52 could be replaced by a bolt extending from the inwardly extending members 60 through an appropriate aperture in the base member 12 and, for example a wing nut could be threadably attached to the bolts and tightened thereon to secure the filter element 14 and the bass member 12 together.

A gasket 62 is provided to provide a seal between the filter element 14 and the base member 12.

Figure 3:
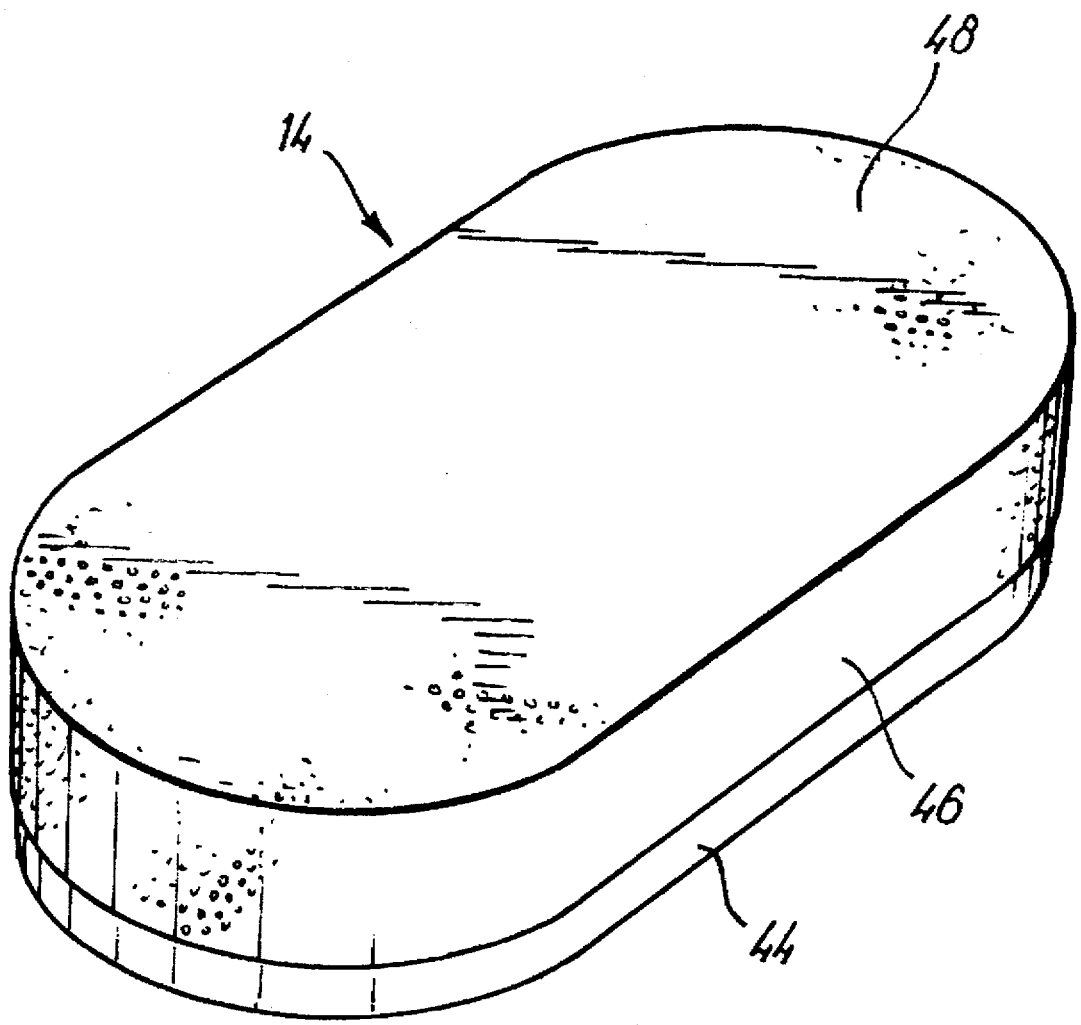
FIG. 3 is a perspective view of a second embodiment.

Referring to FIGS. 3 and 4, there is shown an alternative embodiment of the invention, in which corresponding features have been designated with the same reference numeral. As can be seen, the embodiment shown in FIGS. 3 and 4 is of an oval configuration. The base member 12 is provided with first and second openings 126 adapted to be fitted over corresponding inlet ports on the carburettor. The openings 126 correspond with the aperture 26 in FIGS. 1 and 2. The air filter 10 shown in FIGS. 3 and 4 is attached to the carburettor by passing appropriate bolts through apertures 128 formed in the base member 12. The bolts are received in appropriately threaded recesses in the carburettor.

The filter element 14 is manufactured by a moulding process. This process comprises arranging the mesh 50, and the gasket 62 in a mould and then introducing liquid polyurethane into the mould. The liquid polyurethane cures to form the support frame 44.

The filter material 38 which is preformed from a reticulated polyurethane material is then affixed to the mesh 50 end the support frame 44 by an appropriate adhesive which would be available to the person skilled in the art. The receptacles 58 can also be arranged in the mould before introducing the liquid polyurethane material. Thus, the liquid polyurethane material cures to form the support frame 44 having said receptacles 58 integrally attached thereto.

Alternatively, the filter element 14 can be formed by a one step moulding process whereby said filter material 38, said mesh 50, end said receptacle 58 are introduced into the mould at the same time as the liquid plastics material. Curing of said liquid plastics material bends the components thereof to the support frame 44 thereby obviating the need for a separate step to affix the filter material to the mesh 50 and the support frame 44.

Various modifications can be made without departing from the scope of the invention. For example, the filter can be made of any desired shape.

Whilst endeavouring in the foregoing specification to draw attention to those features of the invention believed to be or particular importance it should be understood that the Applicant claims protection in respect of any patentable feature or combination of features hereinbefore referred to and/or shown in the drawings whether or not particular emphasis has been placed thereon.

I claim:

1. An air filter adapted for being mounted adjacent to a carburetor of an internal-combustion engine, said air filter comprising:
    (a) a base defining a central air-inlet opening therein for communicating with the carburetor, and including base attachment means for permanently attaching the base to the engine without substantially obstructing the air-inlet opening to the carburetor;
    (b) a removable filter element comprising a filter support frame positioned on the base, and a filter medium carried by the support frame and surrounding the air-inlet opening to the carburetor for filtering an air stream passing through the air filter to the carburetor; and (c) a plurality of releasable securing means spaced-apart along respective engaging surfaces of the filter support frame and the base, and cooperating to releasibly secure the filter element to the base, said releasable securing means operating independent of the base attachment means such that the filter medium is readily removable and replaceable without detaching the base from the engine.

2. An air filter according to claim 1, wherein the filter element is in the form of a one piece molding.

3. An air filter according to claim 1, wherein the filter medium is formed of a foamed plastic material.

4. An air filter according to claim 1, wherein the filter medium comprises an inner section having fine filter properties and an outer section having coarse filter properties.

5. An air filter according to claim 1, wherein the filter element comprises a top wall and a side wall.

6. An air filter according to claim 5, wherein the filter element further includes strengthening means to impart rigidity to said filter medium.

7. An air filter according to claim 6, wherein the strengthening means comprises a wire mesh arranged on the inside of said side wall, and a wire mesh arranged on the inside of said top wall.

8. An air filter according to claim 1, and comprising sealing means provided between said support frame and said base.

9. An air filter according to claim 8, wherein the sealing means is provided on the support frame and is in the form of a gasket.

10. An air filter according to claim 1, wherein the attachment means comprises an elongate mounting strip extending across the opening formed in said base.

11. An air filter according to claim 10, wherein the attachment means further comprises a connecting member which passes through an aperture formed in said elongate strip to permanently connect the base to the carburetor.

12. An air filter according to claim 11, wherein the connecting member comprises an elongate threaded male member adapted to be threadably received in an appropriate threaded recess or aperture in the carburetor.

13. An air filter according to claim 12, wherein the elongate strip comprises a central portion through which the threaded male member extends and first and second mid portions arranged opposite each other between said central portion and said end portions.

14. An air filter according to claim 13, wherein the mid portions are substantially planar and are arranged substantially perpendicular to said base.

15. An air filter for an internal-combustion engine, comprising:

(a) a base for being permanently attached to the engine;

(b) a removable filter element comprising a filter support frame positioned on the base, and a filter medium carried by the support frame for filtering an air stream passing through the air filter; and (c) a plurality of releasable securing means spaced-apart along respective engaging surfaces of the filter support frame and the base and cooperating to releasibly secure the filter element to the base, said releasable securing means operating independent of the base attachment means such that the filter medium is readily removable and replaceable without detaching the base from the engine.

16. An air filter according to claim 15, wherein the base defines a central air-inlet opening therein adapted for communicating with a carburetor of the engine.

17. An air filter according to claim 16, and comprising an elongate mounting strip extending across the opening formed in said base.

18. An air filter according to claim 17, wherein the elongate strip has opposite end portions and extends across said opening, the elongate strip defining an aperture through which a threaded male member is adapted to extend to secure the base to the carburetor, the elongate strip being attached at its opposite end portions to said base.

* * * * *